United States Patent Office 3,657,213
Patented Apr. 18, 1972

3,657,213
WATER-SOLUBLE BASIC AZO DYESTUFFS CONTAINING A QUATERNIZED HETEROCYCLIC GROUP BOUND TO THE DYESTUFF THROUGH AN OXYALKYL BRIDGE
Visvanathan Ramanathan, Basel, Switzerland, assignor to Ciba Limited, Basel, Switzerland
No Drawing. Continuation-in-part of application Ser. No. 648,205, June 23, 1967. This application Mar. 2, 1970, Ser. No. 15,920
Claims priority, application Switzerland, July 4, 1966, 9,650/66
Int. Cl. C09b *31/14, 29/36*
U.S. Cl. 260—156                                     5 Claims

---

ABSTRACT OF THE DISCLOSURE

Water-soluble basic dyestuffs which contain a heterocyclic residue, the quaternary ring nitrogen atom of which is bound to an alkyl group belonging to the dyestuff through an oxygen bridging component. The new dyestuffs yield on polyacrylonitrile fibre dyeings with good general fastness-properties. The new dyestuffs produce intense and level dyeings possessing a good fastness, especially a good fastness to washing, perspiration, sublimation, crease-resist finishing, decatizing, hoe-pressing, rubbing, carbonizing, water, sea water, dry cleaning, cross-dyeing and solvents, on these fibres, which may also be dyed in admixture with one another. The new dyestuffs of the invention also display, inter alia, good stability in a wide pH range, good affinity in aqueous solutions of different pH values and a good fastness to kier boiling. Furthermore, the new dyestuffs reserve well on wool and other natural or synthetic polyamide fibres.

---

This is a continuation-in-part application of our copending application Ser. No. 648,205 filed June 23, 1967, now abandoned.

The present invention provides dyestuffs free from acidic groups imparting solubility in water, especially sulphonic acid and carboxyl groups, which contain at least one heterocyclic residue, the quaternary nitrogen atom of which is bound to a carbon atom of an alkyl group belonging to the dyestuff molecular through an oxygen bridge. The invention thus provides, in particular, dyestuffs of the formula (1)  $A\text{—}Y\text{—}Q^+)X^-$ in which A represents the radical of a dyestuff which is free from sulphonic acid and carboxylic acid groups, Y represents an aliphatic carbon chain which may be branched and which contains not more than 4 carbon atoms, Q represents a heterocyclic residue bound to an oxygen atom through its quaternated nitrogen atom and X represents an anion.

The dyestuffs may be further represented as follows:

$A_1\text{—}N\text{=}N\text{—}B$ in which $A_1$ represents a member selected from the group consisting of a benzene, thiazole-, benzthiazole-, pyrazole-, indazole-, triazole-, thiadiazole-, pyridine- and quinoline radical, which may contain no other substituents than lower alkyl, trifluoromethyl, lower alkoxy, chlorine, bromine, cyano, nitro, phenylazo, lower alkoxycarbonyl, lower alkanecarbonyl, lower alkanesulfonyl, phenylcarbonylamino, lower alkanoylamino, lower alkanesulfonyl-amino and sulfonamide, and B represents phenyl or phenyl substituted by chlorine, bromine, lower alkyl, trifluoromethyl, lower alkoxy, phenylcarbonylamino, lower alkanoylamino or lower alkanesulfonylamino, which radical B further contains a residue of the formula $-Y\text{—}O\text{—}Q^+X^-$ wherein Y represents an alkylene bridge containing up to 4 carbon atoms and attached to B via an —O—, —S—, —NH—, $-\overset{|}{N}-$

—SO$_2$—, —COO—, —SO$_2$NH—, $-SO_2\overset{|}{N}-$

—CONH— or $CO\overset{|}{N}-$ bridge, Q represents pyridine, quinoline or isoquinoline or pyridine, quinoline or isoquinoline substituted by chlorine, lower alkyl or lower alkoxy, Q being bound to the oxygen atom through its quaternary nitrogen atom and X represents an anion, and wherein "lower" means containing up to 4 carbon atoms and "sulfonamide" means an unsubstituted sulfonic acid amide group or a sulfonic acid amide group substituted by lower alkyl, aryllower-alkyl or aryl, wherein "lower" has the meaning given above and "aryl" means unsubstituted phenyl or phenyl substituted by lower alkyl, lower alkoxy, chlorine or bromine; and more particularly $$X_S\text{—}\underset{Z_S}{\overset{Y_S}{\bigcirc}}\text{—}N\text{=}N\text{—}\underset{V}{\overset{W}{\bigcirc}}\text{—}N\overset{R_2}{\underset{CH_2CH_2\text{—}O\text{—}\overset{+}{N}\underset{X^-}{\bigcirc}}{\diagdown}}R_1$$

wherein $X_S$ represents hydrogen, chlorine, bromine, cyano, lower alkanecarbonyl, lower alkanesulfonyl, sulfonamide, phenylazo or nitro, $Y_S$ represents hydrogen, chlorine, bromine, nitro, lower alkyl, lower alkoxy, trifluoromethyl, lower alkanecarbonyl or cyano and $Z_S$ represents hydrogen, chlorine or bromine, and in which at least one of the residues $X_S$ and $Y_S$ represents nitro, lower alkanecarbonyl, cyano, lower alkanesulfonyl or sulfonamide, V represents hydrogen, chlorine, bromine, lower alkyl, lower alkoxy, phenylcarbonylamino, lower alkanoylamino or lower alkanesulfonylamino, W represents hydrogen, lower alkyly or lower alkoxy, $R_1$ represents hydrogen, lower alkyl or lower alkoxy, $R_2$ represents lower alkyl, cyanoloweralkyl, loweralkoxyloweralkyl, benzyloxyloweralkyl, arylloweralkyl or a residue of the formula $-CH_2\text{—}CH_2\text{—}O\text{—}Q^+X^-$ wherein X represents an anion of the group consisting of chlorine, bromine, iodine, =SO$_4$, —SO$_3$-lower alkyl, —SO$_3$-aryl or —SO$_3$O-lower alkyl, and wherein "lower" means containing up to 4 carbon atoms, "sulfonamide" means an unsubstituted sulfonic acid amide group or a sulfonic acid amide group substituted by lower alkyl, arylloweralkyl or aryl, and "aryl" means unsubstituted phenyl or phenyl substituted by lower alkyl, lower alkoxy, chlorine or bromine. The dyestuffs of the above formula are new and may be manufactured in accordance with the invention by reaction with N-oxides, or by condensation or coupling.

(a) Manufacture by reaction with an N-oxide may be effected by reacting a dyestuff of the formula (2)                $A\text{—}Y\text{—}Z$ in which Y represents an alkyl residue and Z represents a reactive substituent, for example, a halogen atom, a sulphato group or an aryl or alkylsulphonyloxy group, with a compound Q, that is to say, with an N-oxide of a heterocycle containing a ring nitrogen atom, for example, with pyridine-1-oxide.

Dyestuff radicals A that may be mentioned are those belonging to the nitroso, nitro, styryl, stilbene, diarylmethane, triarylmethane, methine, polymethine, sulphur, anthraquinone, quinoneimine, azine, oxazine, thiazine, perinone, naphthoquinone, indigo, quinophthalone, pyrazolone, xanthene, acridine, quinoline, cyanine, phthalocyanine, azomethine series, or especially to the monoazo, disazo or polyazo series. Suitable anthraquinone dyestuff radicals are, for example, those of the formula

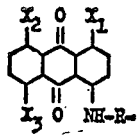

in which R represents a low-molecular alkyl residue or an aryl residue, for example, a methylene or a phenylene residue, $X_1$ represents an —$NH_2$ group or an —OH— group and $X_2$ and $X_3$ each represents a hydrogen atom or an —$NH_2$ group, an —OH group or an $NO_2$ group, or those anthraquinones which contain further substituents in ortho-position to one of the two groups $X_1$ or

—NH—R— for example, halogen atoms or alkyl or alkoxy groups.

Dyestuffs belonging to the anthraquinone series which may be mentioned as starting materials for reaction with the pyridine-1-oxide are those of the formulae indicated below, in which formulae Z has the meaning given above and may represent, in particular, a chlorine atom, a sulphato group or an aryl or alkylsulphonyloxy group:

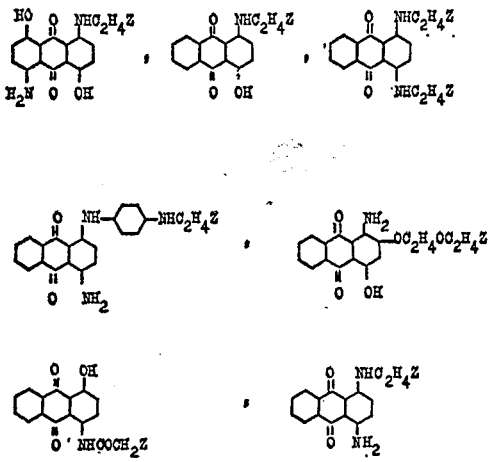

Starting materials belonging to the series of nitro dyestuffs, in which Z has the meaning mentioned above, that may be mentioned are as follows:

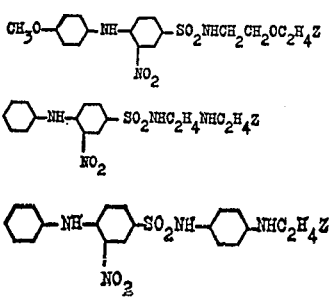

Examples of styryl dyestuffs that may be mentioned, in which Z also has the same meaning, are as follows:

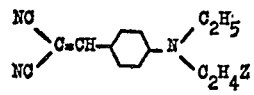

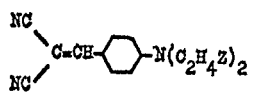

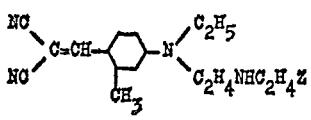

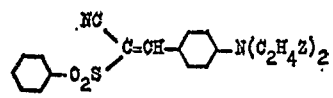

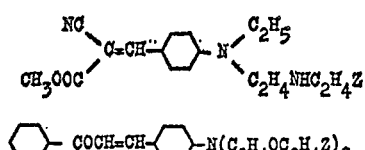

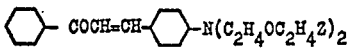

Suitable azo deystuffs that may be mentioned are those obtained by coupling diazotized amines, preferably amines of the aromatic or heterocyclic series, with any desired coupling components, it being essential that at least one of the two components contains a reactive atom or a reactive group. A list of diazo and coupling components that may be used is given below in the section dealing with manufacture by coupling.

According to method (a), these dyestuffs are reacted with N-oxides of heterocycles having aromatic characteristics containing a ring nitrogen atom, preferably six-membered heterocycles, for example, 1-pyridine oxide or 1-quinoline oxide.

N-oxides of the kind defined which may be mentioned are, more especially, pyridine-, quinoline- and isoquinoline-1-oxides, for example, the 1-oxides of pyridine, picoline, lutidine, collidine, anisyl, butyl, ethyl-, ethyl-methyl-, phenyl-, diphenyl-, triphenyl-, acetoamido-, acetyl-, bromo-, bromomethyl-, bromomethoxy-, chloro-chloromethyl-, chlorodimethyl-, cyano-, diacetamino-, dibromo-, diethoxy, ethoxy-, ethoxymethyl-, aceto-amido-, nitro-, acetoxymethyl-, amino-, aminomethyl-, aminodimethyl-, amyloxy-, benzyloxy-, benzyloxyethyl-, diamino-, diethylamino-, dimethylmethoxy-, dimethylnitro-, methylnitro- or hydroxy-pyridine, nicotinic acid amide, nicotinic acid ethyl ester, picolinic acid amide, and also the 1-oxides of quinoline, isoquinoline and the derivatives of quinoline and isoquinoline substituted with halogen atoms or with alkyl, alkoxy, aryl, aralkyl, aryloxy, acylamido, acyloxy, nitro, amino, cyano or hydroxyl groups.

The reaction between a dyestuff containing a halogen atom or a sulphatoalkyl group and the heterocyclic N-oxide is carried out in a neutral solvent, for example, in chlorobenzene or dimethylformamide, or also in the absence of a solvent, advantageously at an elevated temperature and, if necessary, in the presence of a catalyst, for example, NaI.

In method (b), which is manufactured by condensation, a reactive dyestuff derivative is reacted with an N-alkyl derivative of a quaternated heterocyclic amine which contains a reactive atom or a reactive group. For example, a compound of the formula (3)              (Z'—Y—Q+)X− in which X, Y and Q have the meanings given above and Z' represents a reactive atom or a reactive group, for example, a halogen atom, a sulphato group, an amino group, a carboxylic acid or sulphonic acid chloride group, and the like, may be reacted with a compound of the formula A'—Z", in which A' represents a dyestuff radical and Z" represents a reactive atom or a reactive group which is capable of reacting with Z'. The radicals A' may be derivatives of the same parent compounds as the radicals A mentioned above.

In accordance with method (c) of the process of the invention, the end products may also be obtained from dyestuff intermediate products by coupling. This method is specially suitable for the manufacture of azo dyestuffs. To this end, a diazotized amine is coupled with a coupling component, it being essential that ether the diazo component or the coupling component contains the residue of the formula

—Y—Q+)X− as defined above, for example, a residue of the formula

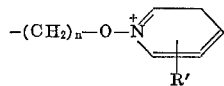

in which R' represents a hydrogen atom or an alkyl group and n represents an integer, preferably 1, 2 or 3.

Examples of diazo compounds that may be mentioned are principally aromatic compounds, for example, those belonging to the naphthalene series, and especially the benzene series. They correspond, for example, to the formula

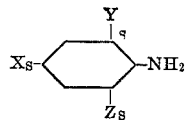

in which $X_S$ represents a hydrogen or a halogen atom or a cyano, carbalkoxy, alkanesulphonyl, sulphonamide, phenylazo or nitro group, $Y_S$ represents a hydrogen or a halogen atom, or a nitro, alkyl, alkoxy, trifluoromethyl, carbalkoxy or cyano group and $Z_S$ represents a hydrogen or a halogen atom, and in which at least one of the residues $X_S$ and $Y_S$ represents a halogen atom or a nitro, carbalkoxy, cyano, alkylsulphonyl, sulphonamide or phenyl azo group.

Examples of diazo components of the benzene series that may be used are as follows:

aniline,
1-amino-3- or 4-chlorobenzene,
1-amino-4-bromobenzene,
1-amino-2-, -3- or -4-methylbenzene,
1-amino-2-, -3- or -4-nitrobenzene,
1-amino-4-cyanobenzene,
1-aminobenzene-3- or -4-methylsulphone,
1-amino-2-chlorobenzene-4-methylsulphone,
1-amino-2,5-dicyanobenzene,
1-amino-4-carbethoxybenzene,
1-amino-2,4- or -2,5-dichlorobenzene,
1-amino-2,4-dibromobenzene,
1-amino-2-methyl-4- or -6-chlorobenzene,
1-amino-2-trifluoromethyl-4-chlorobenzene,
1-amino-2-cyano-4-chlorobenzene,
1-amino-2-cyano-4-nitrobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene,
1-amino-2-chlor-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,5- or 2,6-dichlorobenzene-4-sulphonic acid dimethylamide,
1-amino-2-chlorobenzene-4-sulphonic acid dimethylamide,
1-amino-2,6-dibromobenzene-4-sulphonic acid amide,
1-amino-2,4-dinitro-6-chloro- or -6-bromobenzene,
1-amino-2,4-dicyano-6-chlorobenzene,
1-amino-2,4,6-trichloro- or tribromobenzene,
1-aminobenzene-3- or -4-sulphonic acid amide,
1-aminobenzene-3- or -4-sulphonic acid-N-methyl- or diethyl amide,
4-aminobenzene,
4-amino-2'-chloroazobenzene,
4-amino-2',4'-dichloroazobenzene,
4-amino-3'-chloroazobenzene,
4-amino-2'-nitroazobenzene,
1-amino-4-nitrobenzene-2-methylsulphone,
1-aminobenzene-4-carboxylic acid-β-methoxyethyl ester,
4-amino-3-nitroazobenzene,
4-amino-3'-nitroazobenzene,
4-amino-2-methylazobenzene,
4-amino-4'-methoxyazobenzene,
4-amino-3-nitro-2'-chloroazobenzene,
4-amino-3-nitro-4'-chloroazobenzene,
4-amino-3-nitro-2',4'-dichloroazobenzene,
4-amino-3-nitro-4'-methoxyazobenzene,
4-aminodiphenyl and 2- or 4-aminodiphenyl ether.

The diazo component may also be any desired diazotizable heterocyclic amine which is free from acidic substituents imparting solubility in water, but especially an amine having a heterocyclic five-membered ring containing 2 or 3 hetero atoms, especially a nitrogen atom or one or two sulphur, oxygen or nitrogen atoms.

Examples of heterocyclic diazo components that may be mentioned are as follows:

2-aminothiazole,
2-amino-5-nitrothiazole,
2-amino-5-methylsulphonylthiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-nitrobenzthiazole,
2-amino-6-carboethoxybenzthiazole,
2-amino-6-methylsulphonylbenzthiazole,
2-amino-1,3,4-thiadiazole,
2-amino-1,3,5-thiadiazole,
2-amino-4-phenyl- or -4-methyl-1,3,5-thiadiazole, and
2-amino-5-phenyl-1,3,5-thiadiazole.

When using the above-mentioned diazo components, the grouping of the formula

—Y—Q+)X− must be present in the coupling component, provided it is not introduced subsequently by reaction with an N-oxide. As such coupling components there may be mentioned, for example, the compounds of the formulae given below, in which formulae Q' represents a quaternated heterocyclic residue, that is to say, the residue —Q⁺)X⁻, as defined above, which is bound to an oxygen atom through its nitrogen atom:

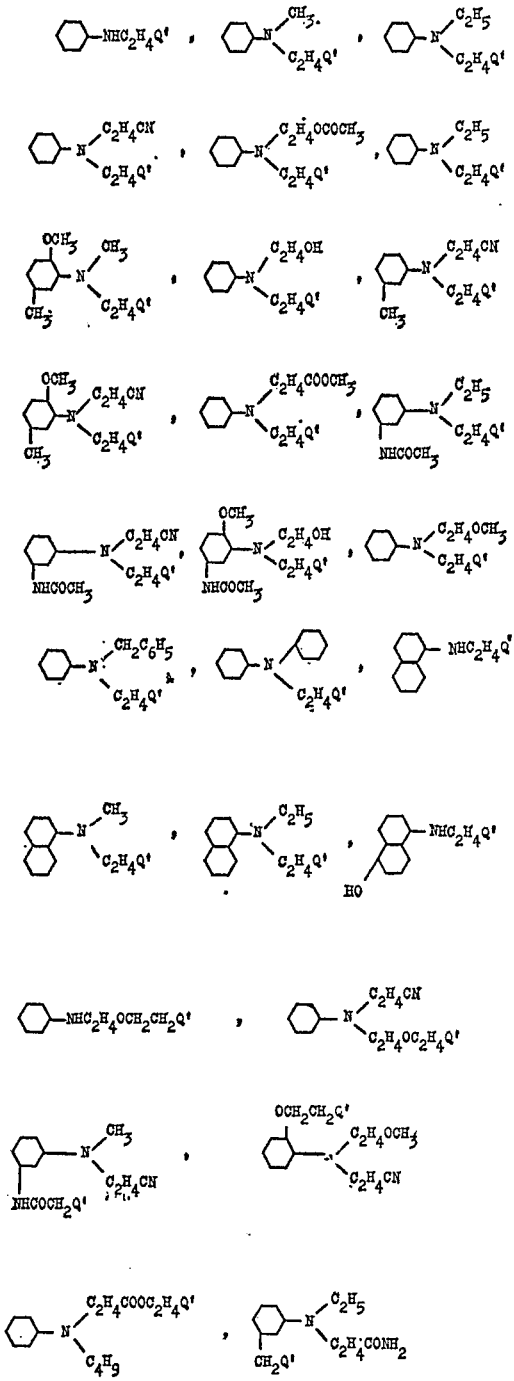

When using coupling components which do not contain the grouping of the formula

—Y—Q⁺)X⁻ the said grouping must be present in the diazo component, provided it is not introduced subsequently by condensation. Such diazo components are, especially, aminobenzene of the formula X⁻(Q⁺—alk—CO—A—NH₂)

in which X and Q have the meanings ascribed to them in Formula 1, alk represents an alkylene bridging group and A represents a benzene nucleus which may carry substituents, for example, halogen atoms, nitro groups or low alkyl or alkoxy groups. The following compounds may be mentioned as examples of quaternated derivatives:

4-amino-α-(N-chloro-N-pyridyl-hydroxy)-acetophenone,
4-amino-3-methyl-α-(N-chloro-N-pyridyl-hydroxy)-acetophenone,
4-amino-3-methoxy-α-(N-chloro-N-pyridyl-hydroxy)-acetophenone,
4-amino-3-chloro-α-(N-chloro-N-pyridyl-hydroxy)-acetophenone,
4-amino-3-bromo-α-(N-chloro-N-quinolinyl-hydroxy)-acetophenone,
4-amino-2-chloro-α-(N-chloro-N-quinolinyl-hydroxy)-acetophenone,
4-amino-2,5-dimethyl-α-(N-chloro-N-quinolinyl-hydroxvy)-acetophenone,
4-amino-β-(N-chloro-N-pyridyl-hydroxy)-propionphenone,
4-amino-β-(N-chloro-N-methyl-N-piperidyl-hydroxy)-propiophenone,
3-amino-α-(N-chloro-N-pyridyl-hydroxy)-acetophenone and
4-amino-α-(N-bromo-N-pyridyl-hydroxy)-acetophenone.

These diazo components can be obtained by methods known per se, for example by reacting acetylaminobenzene with chloroacetyl chloride or chloropropionyl chloride, reacting the resulting chloroacylacetylaminobenzene with the N-oxide of the heterocyclic amine, and splitting off the acetyl group.

Also suitable as diazo components containing a quaternated heterocyclic group of the kind defined are those corresponding to the general formula

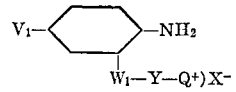

in which V₁ represents a nitro or an alkylsulphonyl group or a sulphonamide group that may be substituted, W₁ represents a divalent residue, for example, an —O— or an —S— bridging component or a direct bond, and X, Y and Q have the meanings ascribed to them in Formula 1, and in which the benzene residue may contain further substituents. Diazo components of the kind defined are, for example, the compounds having the following formulae:

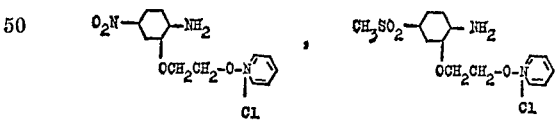

or

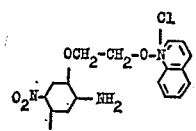

Other suitable diazo components which contain the residue of the formula

—Y—Q⁺)X⁻ as defined above are those which correspond to the general formula

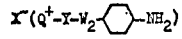

in which W₂ represents a divalent organic residue, for example, a residue of the formula —SO₂—, —SO₂NR₄—, —CONR₄— or —COO—, and X, Y and Q have the meanings ascribed to them in Formula 1. Such diazo components are, for example,

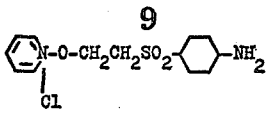

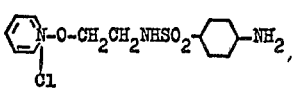

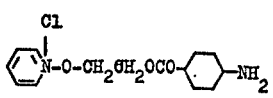

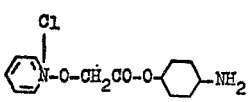

In the reaction with the last-mentioned diazo components, any desired azo components may be used as coupling components, for example, those belonging to the benzene or naphthalene series or those belonging to the series of heterocyclic azo components. Apart from the phenols, for example, para-cresol, the coupling components of the benzene series that may be mentioned in particular are the aminobenzenes, for example, aniline,
3-methylaniline,
2-methoxy-5-methylaniline,
3-acetylamino-1-aminobenzene,
N-methylaniline,
N-$\beta$-hydroxyethylaniline,
N-$\beta$-methoxyethylaniline,
N-$\beta$-cyanoethylaniline,
N-$\beta$-chloroethylaniline,
dimethylaniline,
diethylaniline,
N-methyl-N-benzylaniline,
N-n-butyl-N-$\beta$-chloroethylaniline, N-methyl-N-$\beta$-cyanoethylaniline,
N-methyl-N-$\beta$-hydroxyethylaniline,
N-ethyl-N-$\beta$-chloroethylaniline,
N-methyl-N-$\beta$-acetoxyethylaniline,
N-ethyl-N-$\beta$-methoxyethylaniline,
N-$\beta$-cyanoethyl-N-$\beta$-chloroethylaniline,
N-cyanoethyl-N-acetoxyethylaniline,
N,N-di-$\alpha$-hydroxyethylaniline,
N,N-di-$\beta$-acetoxyethylaniline,
N-ethyl-N,2-hydroxy-3-chloropropylaniline,
N,N-di-$\beta$-cyanoethylaniline,
N,N-di-$\beta$-cyanoethyl-3-methylaniline,
N-$\beta'$-cyanoethyl-N-$\beta''$-hydroxyethyl-3-chloroaniline,
N,N-di-$\beta$-cyanoethyl-3-methoxyaniline,
N,N-dimethyl-3-acetylaminoaniline,
N-ethyl-N-$\beta$-cyanoethyl-3-acetylaminoaniline,
N,N-di-$\beta$-cyanoethyl-2-methoxy-5-acetyl-aminoaniline,
N-methyl-N-phenacylaniline,
N-$\beta$-cyanoethyl-2-chloroaniline,
N,N-diethyl-3-trifluoromethylaniline,
N-ethyl-N-phenylaniline,
diphenylamine,
N-methyldiphenylamine,
N-methyl-4-ethoxy-diphenylamine or N-phenylmorpholine,
and also the amines of the formula

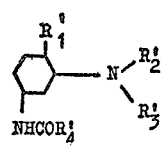

in which $R_1'$ represents a hydrogen atom or an alkyl or alkoxy group, $R_2'$ represents a cyanoalkoxyalkyl group, $R_3'$ represents a hydrogen atom, a cyanoalkoxyalkyl group or an acyloxyalkyl group and $R_4'$ represents a hydrogen atom, an alkyl, cycloalkyl or alkoxy group that may be substituted or a benzene residue, and especially those of the formula

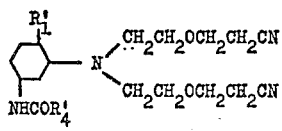

in which $R_1'$ and $R_4'$ have the meanings given above.

Specially valuable results may also be obtained with coupling components of the formula

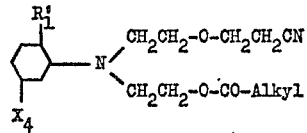

and

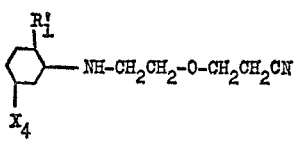

in which $R_1'$ has the meaning given above and $X_4$ represents an acylamino group, and in which "alkyl" represents, for example, a methyl, ethyl or propyl group.

The following coupling components are mentioned as examples:

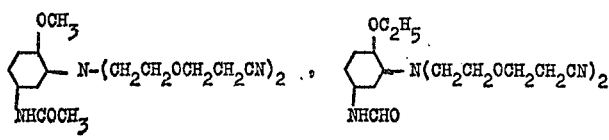

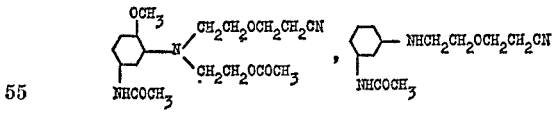

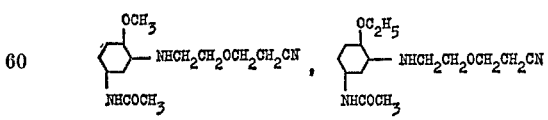

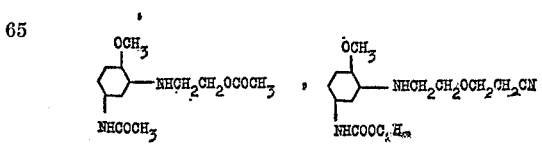

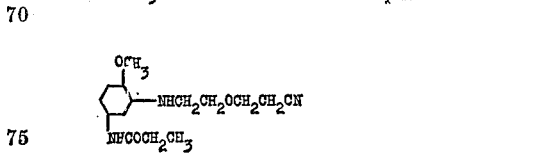

Coupling components belonging to the naphthalene series that may be mentioned apart from the naphthols are, for example, 1- or 2-naphthylamine, 2-phenylaminonaphthalene, 1 - dimethylaminonaphthalene and 2-ethylaminonaphthalene, and also, for example, 2-aminonaphthalene-3-carboxylic acid amide,
2-aminonaphthalene-3-carboxylic acid anilide,
2-aminonaphthalene-3-carboxylic acid-N-methylanilide,
2-aminonaphthalene-3-carboxylic acid benzylamide,
2-aminonaphthalene-3-carboxylic acid methyl ester,
2-aminonaphthalene-3-carboxylic acid butyl ester,
2-aminonaphthalene-3-carboxylic acid - $\beta$ - hydroxyethyl ester,
2-aminonaphthalene-3-carboxylic acid phenyl ester.

Coupling components belong to the heterocyclic series that may be mentioned are, for example, the indoles, for example, 2-methylindole,
2,5-dimethylindole,
2,4-dimethyl-7-methoxyindole,
2-phenyl- or -methyl-5-ethoxyindole,
2-methyl-5- or -6-chloroindole,
1,2-dimethylindole, 1-methyl-2-phenylindole,
2-methyl-5-nitroindole,
2-methyl-5-cyanoindole,
2-methyl-7-chloroindole,
2-methyl-5-fluoro- or -5-bromoindole,
2-methyl-5,7-dichloroindole or 2-phenylindole,
1-cyanoethyl-2,6-dimethylindole, and also pyrazoles, for example, 1-phenyl-5-aminopyrazole or
3-methyl-pyrazolone-5 or
1-phenyl-3-methylpyrazolone-5,
1,3-dimethyl-pyrazolone-5,
1-butyl-3-methyl-pyrazolone-5,
1-hydroxyethyl-3-methyl-pyrazolone-5,
1-cyanoethyl-3-methylpyrazolone-5,
1-(orthochlorophenyl)-3-methyl-pyrazolone-5,
3-carbomethoxy-pyrazolone-5, quinolines, for example, 1-methyl-4-hydroxyquinoline-2,
N-ethyl-3-hydroxy-7-methyl-1,2,3,4-tetrahydroquinolone or pyrimidines, for example, barbituric acid, and also 1,3-indandione, 1,8-naphthinedandione or dimedone.

Instead of a single diazo component, it is also possible to use a mixture of two or more of the diazo components of the invention, and, instead of a single coupling component, it is also possible to use a mixture of two or more coupling components of the invention.

Diazotization of the above-mentioned diazo components may be carried out in known manner, for example, with the aid of a mineral acid, especially hydrochloric acid, and sodium nitrite or, for example, with a solution of nitrosyl sulphuric acid in concentrated sulphuric acid.

Coupling may also be carried out in known manner, for example, in a neutral to acid medium, if necessary, in the presence of sodium acetate or a similar buffer which influences the rate of coupling, or catalyst, for example, pyridine, or a salt thereof.

If the dyestuff salts have to be purified, this can advantageously be done by dissolving them in water, and any unreacted starting dyestuff can then be filtered off as insoluble residue. The dyestuff may be precipitated from the aqueous solution by the addition of a water-soluble salt, for example, sodium chloride.

The quarternated dyestuffs obtained by the process of the invention preferably contain as anion the residue of a strong acid, for example, sulphuric acid, or a semi-ester thereof, or the residue of an arylsulphonic acid or a halogen ion.

The said anions, which may be introduced into the dyestuff molecule in accordance with the invention, may also be replaced by anions of other inorganic acids, for example, phosphoric acid or sulphuric acid, or by the anions of organic acids, for example, formic acid, lactic acid or tartaric acid; in some cases it is also possible to use the free bases. The dyestuff salts may also be in the form of double salts, for example, with halides of elements of Group II of the Periodic Table, especially zinc chloride or cadmium chloride.

The dyestuffs or dyestuff salts obtained by the process of the invention which contain a quaternated amino group are suitable for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres, but especially polyacrylonitrile fibres or polyvinylidene cyanide fibres (Darvan). By polyacrylonitrile fibres is meant principally polymers containing more than 80 percent of acrylonitrile, for example, 80 to 95 percent; they also contain 5 to 20 percent of vinyl acetate, vinylpyridine, vinyl chloride, vinylidene chloride, acrylic acid, acrylic acid ester, methacrylic acid, methacrylic acid ester, and so forth. These products are sold under the following registered trademarks: "Acrilan 1656" (Chemistrand Corporation, Decatur, Alabama, U.S.A.), "Acrilan 41" (Chemstrand Corporation), "Creslan" (American Cyanamid Company), "Orlon 44" (Du Pont), "Crylor HH" (Soc. Rhodiaceta SA, France), "Leacril N" (Applicaziono Chimice Societa per Azioni, Italy), "Dynel" (Union Carbide Chem. Corp.), "Exlan" (Japan. Exlan Industry Co., Japan), "Vonnel" (Mitsubishi, Japan), "Verel" (Tennessee Eastman, U.S.A.), "Zefran" (Dow Chemical, U.S.A.) "Wolcrylon" (Filmfabrik Agfa, Wolfen), "Saniw" (U.S.S.R.) and also "Orlon 42," "Dralon," and "Courtelle."

The new dyestuffs produce intense and level dyeings possessing a good fastness to light and good properties of general fastness, especially a good fastness to washing, perspiration, sublimation, crease-resist finishing, decatizing, hot-pressing, rubbing, carbonizing, water, sea water, dry cleaning, cross-dyeing and solvents, on these fibres, which may also be dyed in admixture with one another. The new dyestuffs of the invention also display, inter alia, good stability in a wide pH range, good affinity in aqueous solutions of different pH values and a good fastness to kier boiling. Furthermore, the new dyestuffs reserve well on wool and other natural or synthetic polyamide fibres.

The quaternated, water-soluble dyestuffs generally show little sensitivity to electrolytes, and some of them display exceptionally good solubility in water or polar solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercially available levelling agents have no deleterious effect if used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which, in addition to the dyestuff, contains the usual printing adjuvants. The dyestuffs are also suitable for the mass-coloration of acrylonitrile polymerization products and other plastic material compositions, if necessary, dissolved compositions, the colorations produced being fast to light and washing. They are also suitable for colouring oil paints and lacquers, and dyeing cotton, especially mordanted cotton, cellulose, regenerated cellulose and paper.

The dyestuffs may also be applied by printing processes. In this method of application the printing pastes contain, for example, in addition to the adjuvants normally used in printing for example, wetting and thickening agents, the finely divided dyestuff, if necessary, in admixture with a cotton dyestuff, if necessary, in the presence of urea and/or an agent capable of binding acid.

The processes described produce strong dyeings and prints possessing excellent properties of fastness, especially a good fastness to light, sublimation, decatizing, washing and chlorinated water. A further advantage offered by the dyestuffs to be used in accordance with the invention is that they reserve wool and cotton well.

The following examples illustrate the invention, unless otherwise stated, the parts and percentages are by weight, and the temperatures are expressed in degrees centigrade.

EXAMPLE 1

82.5 parts of N-ethyl-N-2-hydroxyaniline are dissolved in 160 parts of pyridine. 105 parts of paratoluene-sulphochloride are added in portions at 10 to 15° C. and the batch is stirred for 3 hours. The mixture is discharged into 600 parts of iced water and stirred. The product which precipitates is isolated by filtration, washed with water and dried; it melts at 63 to 64° C.

31.9 parts of N-ethyl-N-2-para-toluenesulphonyloxyethylaniline and 11.4 parts of pyridine-N-oxide are stirred for about 6 hours at 70° C. The reaction mixture formed is used for coupling.

17.2 parts of 2-chloro-4-nitroaniline are pasted with 39 parts by volume of concentrated hydrochloric acid and the pasted is stirred into a mixture of 400 parts of ice and water. The suspension is diazotized at 0 to 5° C. with 25 parts by volume of 4 N sodium nitrite solution. The diazo solution is added to a solution containing the coupling component obtained in the manner described above in 50 parts of alcohol. The coupling mixture is rendered neutral to Congo paper by the addition of sodium acetate solution. After coupling, the dyestuff is precipitated by the addition of sodium chloride. The dyestuff is isolated by suction filtration, dissolved in hot water and freed from insoluble by-products by filtration. The dyestuff of the formula

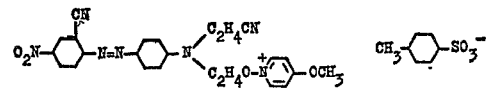

is salted out of the filtrate, isolated by filtration and dried. It dyes polyacrylonitrile fibres strong red tints possessing very good properties of fastness.

The perchlorate of the dyestuff may be obtained by reacting an aqueous solution of the dyestuff with sodium perchlorate. It crystallizes from a mixture of water and alcohol. Elementary analysis of the salt yields the following figures:

C, 48.1; H, 4.0; O, 21.0; N, 13.3; Cl, 13.4; compared with the values calculated for the formula $C_{21}H_{21}Cl_2N_5O_7$ C, 47.9; H, 4.0; O, 21.3; N, 13.3; Cl, 13.5.

EXAMPLE 2

7.6 parts of sodium nitrite are strewn into 90 parts of concentrated sulphuric acid at 0 to 10° C., and then the mixture is heated at 65° C. until dissolution is complete. The solution is cooled to 0° C. and then 100 parts by volume of a 6:1 mixture of glacial acetic acid and propionic acid are added dropwise. 17.7 parts of 5-amino-3-phenyl-1,2,4-thiadiazole, dissolved in 100 parts by volume of a 6:1 mixture of glacial acetic acid and propionic acid, are added dropwise and the reaction mixture is stirred for 3 hours at 0 to 5° C. 7.5 parts of urea are added dropwise to the diazo solution. The diazo solution so obtained is coupled with the coupling component described in Example 1. The coupling mixture is rendered neutral to Congo paper with sodium acetate solution. After coupling, the dyestuff is precipitated by the addition of sodium chloride and zinc chloride. The dyestuff is isolated by suction filtration, dissolved in hot water, and insoluble by-products are removed by filtration. The dyestuff is salted out of the clear filtrate, isolated by filtration and dried. It dyes polyacrylonitrile fibres strong, pure red tints possessing very good properties of fastness.

EXAMPLE 3

13.76 parts of N-cyanoethyl-N-2-para-toluenesulphonyloxyethylaniline and 6 parts of 4-methoxypyridine-N-oxide are stirred for 6 hours at 70° C. The reaction mixture so formed is used for coupling.

The diazo solution, obtained from 6.5 parts of 2-amino-5-nitrobenzonitrile, is added to a solution containing the coupling component obtained in the manner described above in 50 parts of alcohol. After coupling, the dyestuff is precipitated by the addition of ammonium sulphate. The dyestuff is isolated by suction filtration, dissolved in hot water and the solution is filtered. The dyestuff of the formula

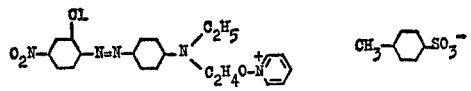

is salted out of the filtrate, isolated by filtration and dried. It dyes polyacrylonitrile fibres strong red tints possessing excellent properties of fastness.

EXAMPLE 4

24 parts of 2-ethylamino-5-nitrophenol-2'-hydroxyethylether are dissolved in 150 parts of pyridine. 12.9 parts of methanesulphochloride are added dropwise at 0 to 5° C. and the batch is stirred for 3 hours. The mixture is discharged into 500 parts of iced water and stirred. The product that precipitates is isolated by filtration, washed with water and dried.

31.8 parts of 2-acetylamino-5-nitrophenol-2'-methanesulphonyloxyethyl ether and 32 parts of pyridine-N-oxide are stirred for about 6 hours at 70° C. 75 parts of hydrochloric acid and 150 parts of water are added to the reaction mixture and the batch is boiled for 1 hour under reflux. The solution is cooled to 0 to 5° C. and then diazotized with 25 parts by volume of 4 N sodium nitrite solution. The diazo solution is added to a solution of 17.4 parts of N-ethyl-N-cyanoethylaniline in 60 parts of alcohol. The coupling mixture is rendered neutral to Congo paper with sodium acetate solution. After coupling, the dyestuff is precipitated by the addition of sodium chloride. The dyestuff is isolated by suction filtration, dissolved in hot water and the solution is filtered. The dyestuff of the formula

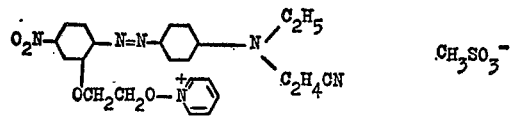

is salted out of the filtrate, isolated by filtration and dried. It dyes polyacrylonitrile fibres strong ruby tints possessing very good properties of fasteness.

Table 1 below lists a number of components that may be used for the manufacture of further dyestuffs. The dyestuffs may be obtained by diazotizing the amines shown in Column I and coupling the diazo compounds so obtained with the coupling components shown in Column II. The tints produced on polyacrylonitrile fibres are indicated in Column III.

TABLE 1
| | I | II | III |
|---|---|---|---|
| 1 | 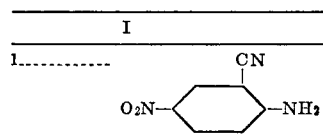 | 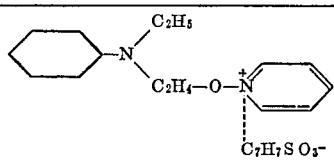 | Claret. |
| 2 | 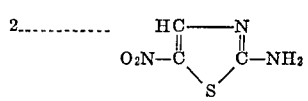 | Same as above | Violet. |
| 3 | 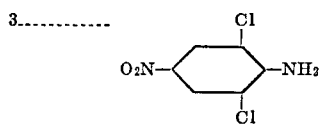 | 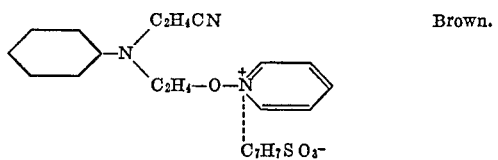 | Brown. |
| 4 | 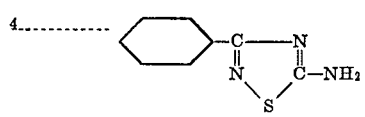 | Same as above | Red. |
| 5 | 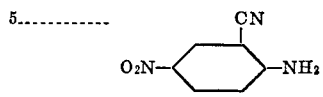 | ......do...... | Ruby. |
| 6 | 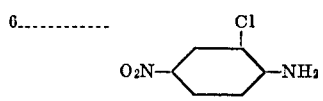 | ......do...... | Scarlet. |
| 7 | 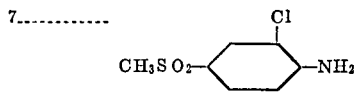 | ......do...... | Orange. |
| 8 | 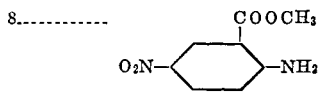 | 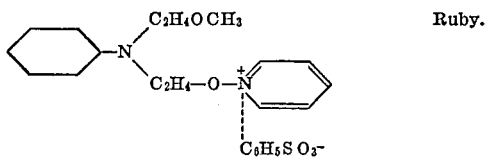 | Ruby. |
| 9 | 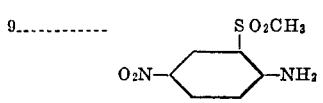 | 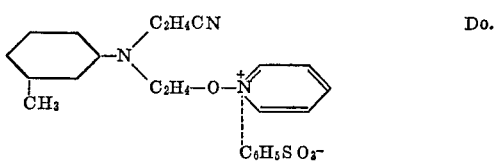 | Do. |
| 10 | 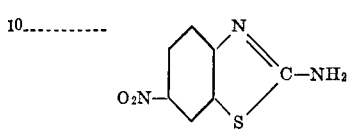 | ......do...... | Claret. |
| 11 | 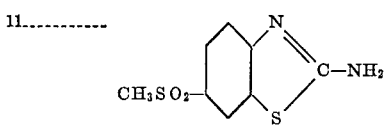 | 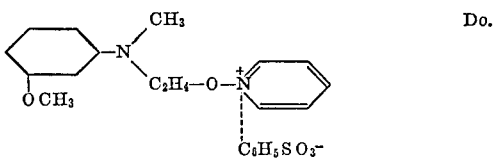 | Do. |
| 12 | 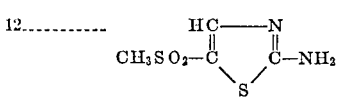 | 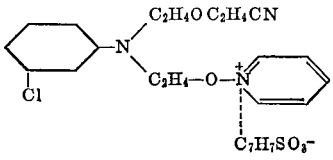 | Violet. |

TABLE 1.—Continued

| | I | II | III |
|---|---|---|---|
| 13 | (thiazole with HC=N, NC-C, S, C-NH₂) | cyclohexyl-N(OC₂H₅)(C₄H₉)-C₂H₄-O-pyridinium, C₇H₇SO₃⁻ | Violet. |
| 14 | (thiazole derivative with NC, N, S, C-NH₂) | cyclohexyl(CF₃)-N(C₂H₅)-C₂H₄-O-pyridinium, C₇H₇SO₃⁻ | Ruby. |
| 15 | C₆H₅-N=N-C₆H₄-NH₂ | cyclohexyl-N(CH₂CH₂—CH₂ ring)-C₂H₄O-pyridinium, C₇H₇SO₃⁻ | Scarlet. |
| 16 | 2,4-dinitro-6-bromoaniline (O₂N, NO₂, Br, NH₂ on ring) | cyclohexyl-N(C₂H₄COOC₂H₅)-C₂H₄-O-(2-methylpyridinium), C₇H₇SO₃⁻ | Claret. |
| 17 | NC-C₆H₄-NH₂ | cyclohexyl-N(C₂H₄OCOCH₃)-C₂H₄O-(4-methylpyridinium), C₇H₇SO₃⁻ | Orange. |
| 18 | 4-nitro-2-methoxyaniline (O₂N, OCH₃, NH₂) | cyclohexyl-N(C₂H₅)-C₂H₄-O-(3-methylpyridinium), C₇H₇SO₃⁻ | Red. |
| 19 | 4-nitro-2,6-dichloroaniline (O₂N, Cl, Cl, NH₂) | cyclohexyl-N(C₂H₄CN)-C₂H₄-O-(4-methoxypyridinium), C₇H₇SO₃⁻ | Brown. |
| 20 | 2,4-dinitroaniline (O₂N, NO₂, NH₂) | Same as above | Red. |
| 21 | 2-chloro-4-trifluoromethylaniline (Cl, NH₂, CF₃) | ....do.... | Reddish yellow. |
| 22 | O₂N-C₆H₄-NH₂ | cyclohexyl-N(C₂H₄CN)-C₂H₄-O-(4-ethoxypyridinium), C₇H₇SO₃⁻ | Orange. |

TABLE 1.—Continued

| | I | II | III |
|---|---|---|---|
| 23 | (CH₃)₂NO₂S–C₆H₃(Cl)–NH₂ (with Cl substituent) | Cyclohexyl–N(C₂H₄CN)(C₂H₄–O–N⁺-pyridine, C₇H₇SO₃⁻) | Yellow brown. |
| 24 | O₂N–C₆H₄–NH₂ | Cyclohexyl–N(C₂H₄CN)(C₂H₄–O–N⁺-isoquinoline, C₇H₇SO₃⁻) | Orange. |
| 25 | Same as above | Cyclohexyl–N(C₂H₄CN)(C₂H₄–O–N⁺-isoquinoline, C₇H₇SO₃⁻) | Do. |
| 26 | O₂N–C₆H₃(OC₂H₄–N⁺-pyridine, CH₃SO₃⁻)–NH₂ | Cyclohexyl(NHCOCH₃)–N(CH₂-cyclohexyl)(C₂H₄CN) | Claret. |
| 27 | Same as above | Cyclohexyl(OCH₃)(NHCOCH₂CH₃)–N(C₂H₄OCH₃)(C₂H₄CN) | Violet. |
| 28 | Same as above | HC=C(CH₃)–N=C(OH)–N(cyclohexyl) (pyrazolone) | Yellow. |
| 29 | Pyridinium–O H₄C₂HNO₂S–C₆H₄–NH₂, CH₃SO₃⁻ | ...do... | Do. |
| 30 | Same as above | Cyclohexyl–N(C₂H₅)(C₂H₄CN) | Orange. |
| 31 | Pyridine–N–O–H₄C₂HNO₂S–C₆H₄–NH₂, CH₃SO₃⁻ | HC=C(CH₃)–fused cyclohexyl with NH (indoline) H₃C–C | Yellow. |
| 32 | Same as above | NH₂-naphthalene | Red. |
| 33 | CH₃OH₄C₂OOC–C₆H₄–NH₂ | Cyclohexyl(NHSO₂CH₃)–N(C₂H₄OC₂H₅)(C₂H₄O–N⁺-pyridine, C₆H₅SO₃⁻) | Scarlet. |

TABLE 1.—Continued

| | I | II | III |
|---|---|---|---|
| 34 | (structure with OCH₃, N=N, NH₂, CH₃) | (structure with CH₂-phenyl, N, C₂H₄N⁺-pyridine-CH₃, OCH₃, HSO₄⁻) | Red. |
| 35 | CH₃-C=CH, C-NH₂, N-N-H (triazole) | (structure with C₂H₄CN, N, CH₂CH-CH₃, CH₃, O, N⁺-pyridine, C₇H₇SO₃⁻) | Orange. |
| 36 | O₂N–phenyl–NH₂ with C₄H₉ | phenyl-N(C₂H₄O⁺-pyridine)₂, Cl, C₇H₇SO₃⁻ | Scarlet. |
| 37 | O₂N–phenyl–NH₂ with Cl and NO₂ | (structure with OCH₃, CH₃, N, C₂H₄O⁺-pyridine, NHCOCH₃, C₆H₅SO₃⁻) | Blue. |
| 38 | piperidine-NH₂ | (fused bicyclic with H₃C, H, H, CH₃, CH₃, N, C₂H₄O⁺-pyridine, CH₃, HC₇H₇SO₃⁻) | Orange. |
| 39 | C₄H₉O–phenyl–NH₂ | (phenyl-N with CH₂CH₂-phenyl and C₂H₄O⁺-pyridine-OCH₃, C₆H₅SO₃⁻) | Do. |
| 40 | Cl–phenyl–N=N–phenyl–NH₂, CH₃ | phenyl-N(C₂H₄O⁺-pyridine)₂, C₄H₉, C₇H₇SO₃⁻ | Red. |
| 41 | Cl-(fused ring)-C-NH₂, N-N-H | (structure with CH₃, N, CH₂CHCH₃, OC₄H₉, O, N⁺-pyridine-CH₃, C₆H₅SO₃⁻) | Brown. |
| 42 | CH₃OOC–phenyl–NH₂ with Br, Br | (phenyl-N with C₂H₄CN and C₂H₄O⁺-pyridine-OCH₃, NHSO₂C₄H₉, C₇H₇SO₃⁻) | Red. |
| 43 | O₂N–phenyl–NH₂ with CN | (structure with C₆H₅SO₃⁻, OC₂H₄O-N⁺-pyridine, CH₃, N, C₂H₄CN) | Claret. |

TABLE 1.—Continued

| | I | II | III |
|---|---|---|---|
| 44 | CH₃ substituted pyrazole with phenyl and NH₂ (CH₃-C=CH, N-N, with NH₂ and phenyl) | Cyclohexyl-N(C₂H₄CN)(C₂H₄O-N⁺-pyridine-CH₃), CH₃SO₃⁻, with CH₃ on ring | Orange. |
| 45 | 4-Cl, 2-CN aniline with NH₂ | Decahydroquinoline-N-C₂H₄O-N⁺(pyridine)-C₇H₇SO₃⁻ | Scarlet. |
| 46 | H₃COOC–C₆H₄–N=N–C₆H₂(CH₃)₂–NH₂ | Cyclohexyl(CH₃)-N(C₂H₄O-N⁺-pyridine)₂·C₇H₇SO₃⁻ | Red. |
| 47 | 4-O₂N, 2-OC₂H₅ aniline-NH₂ | Br-C₆H₄-N(C₂H₄CN)(C₄H₈O-N⁺-pyridine-OC₂H₅)·C₆H₅SO₃⁻ | Scarlet. |
| 48 | 4-O₂N, 2-Br, 6-Cl aniline-NH₂ | 2-OC₄H₉, 4-NHCHO-C₆H₃-N(C₂H₄O-N⁺-pyridine)₂·C₇H₇SO₃⁻ | Violet. |
| 49 | Phenyl-thiadiazole-NH₂ (C₆H₅-C=N-N=C(NH₂)-S) | Cyclohexyl-N(C₂H₄CN)(C₂H₄O-N⁺-pyridine-OC₄H₉)·C₆H₅SO₃⁻ | Scarlet. |
| 50 | 4-CN, 2,6-Cl₂ aniline-NH₂ | Cyclohexyl₂-N-C₂H₄O-N⁺-pyridine·C₆H₅SO₃⁻ | Red. |
| 51 | H₉C₂O₂S–C₆H₄–NH₂ | 3-Cl-C₆H₄-N(C₂H₄CN)(C₂H₄O-N⁺-pyridine-CH₃)·C₆H₅SO₃⁻ | Orange. |
| 52 | H₅C₂OOC–C₆H₄–NH₂ | 4-NHCOC₃H₇-C₆H₄-N(CH₂-C₆H₁₁)(CH₂CHCH₃-O-N⁺-pyridine)·C₇H₇SO₃⁻ | Red. |
| 53 | 4-O₂N, 2-CH₃ aniline-NH₂ | 3-Br-C₆H₄-N(C₂H₄OC₂H₄CN)(C₂H₄O-N⁺-pyridine)·C₆H₅SO₃⁻ | Orange. |

TABLE 1.—Continued

| | I | II | III |
|---|---|---|---|
| 54 | triazole-C-NH$_2$ structure | cyclohexyl-N(C$_2$H$_4$COOC$_2$H$_5$)(C$_2$H$_4$N$^+$-pyridine), Cl substituent, HSO$_4^-$ | Orange. |
| 55 | O$_2$N-C$_6$H$_3$(Cl)-NH$_2$ | cyclohexyl-N(C$_2$H$_5$)$_2$, CH$_2$N$^+$-pyridine, C$_6$H$_5$SO$_3^-$ | Claret. |
| 56 | O$_2$N-C$_6$H$_3$(Cl)-NH$_2$ | dicyclohexyl-NHC$_2$H$_4$N$^+$-pyridine, C$_7$H$_7$SO$_3^-$ | Violet. |
| 57 | (CH$_3$)$_2$NO$_2$S-C$_6$H$_2$(Cl)$_2$-NH$_2$ | cyclohexyl(OCH$_3$,CH$_3$)-N(C$_2$H$_4$CN)(C$_2$H$_4$N$^+$-pyridine), C$_7$H$_7$SO$_3^-$ | Red. |
| 58 | O$_2$N-cyclohexyl-C(NH$_2$)=N-NH | cyclohexyl(C$_2$H$_5$)-N(C$_4$H$_9$)(C$_2$H$_4$N$^+$-pyridine), Br$^-$ | Brown. |
| 59 | O$_2$N-C$_6$H$_2$(OC$_4$H$_9$)(Br)-NH$_2$ | cyclohexyl(OCH$_3$)-N(C$_2$H$_4$CN)(C$_2$H$_4$N$^+$-pyridine), Cl$^-$ | Red. |
| 60 | decahydroquinoline-NH$_2$ | cyclohexyl(NHCOOC$_2$H$_5$)-N(CH$_3$)(C$_4$H$_8$N$^+$-pyridine), Cl$^-$ | Red. |
| 61 | H$_2$NO$_2$S-C$_6$H$_2$(Br)$_2$-NH$_2$ | cyclohexyl-N(C$_2$H$_4$OCOCH$_3$)(C$_2$H$_4$N$^+$-pyridine), Cl$^-$ | Scarlet. |
| 62 | phenyl-thiadiazole-C-NH$_2$ | cyclohexyl-N(C$_2$H$_4$OC$_2$H$_4$CN)(C$_2$H$_4$OC$_2$H$_4$N$^+$-pyridine), Br$^-$ | Do. |
| 63 | H$_5$C$_2$HNO$_2$S-benzothiazole-C-NH$_2$ | cyclohexyl(CH$_3$)-N(C$_2$H$_4$OCH$_3$)(C$_2$H$_4$N$^+$-pyridine), I$^-$ | Red. |
| 64 | CH$_3$CO-C$_6$H$_2$(Cl)$_2$-NH$_2$ | cyclohexyl(OCH$_3$)-N(C$_2$H$_4$CN)(C$_2$H$_4$N$^+$-pyridine), I$^-$ | Orange. |
| 65 | phenyl-thiadiazole-C-NH$_2$ | cyclohexyl(OCH$_3$,CH$_3$)-N(C$_2$H$_4$N$^+$-pyridine)$_2$, C$_6$H$_5$SO$_3^-$ | Red. |

TABLE 1.—Continued

| I | II | III |
|---|---|---|
| 66 | (structure) | Orange. |
| 67 | (structure) | Yellow; |
| 68 | (structure) | Orange; |
| 69 | (structure) | Yellow; |
| 70 | (structure) | Scarlet; |
| 71 | (structure) | Do; |
| 72 | (structure) | Do; |
| 73 | (structure) | Red; |
| 74 | (structure) | Scarlet; |

EXAMPLE 5

4.8 parts of 4 - [2'-methoxy-4'-nitrophenyl]-azo-1-[2"-hydroxyethyl]-3-methyl-5-pyrazolone are dissolved in 150 parts of pyridine. 1.93 parts of methanesulphochloride are added dropwise at 0 to 5° C. and the batch is stirred for 3 hours. The reaction mixture is discharged into 500 parts of iced water and stirred. The product that precipitates is isolated by filtration, washed with water and dried.

4 parts of the methanesulphoester obtained in the manner described above and 10 parts of pyridine-N-oxide are stirred for 6 hours at 70° C. The reaction mixture is boiled up with water, which contains a small amount of acetic acid, and the batch is filtered while hot. The dyestuff of the formula

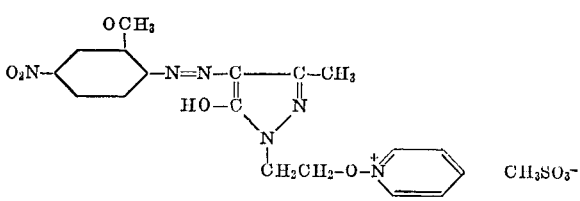

is salted out of the filtrate, isolated by filtration and dried. It dyes polyacrylonitrile fibres strong yellow tints possessing very good properties of fastness.

EXAMPLE 6

5.6 parts of 1-amino-4-hydroxy-2-(2'-para-toluenesulphonyloxy)-ethyl ether and 10 parts of pyridine-N-oxide are stirred for 6 hours at 70° C. The reaction mixture is boiled up with water, which contains a small amount of acetic acid, and the batch is filtered while hot. The dyestuff of the formula

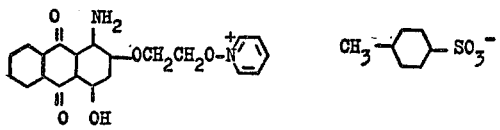

is salted out of the filtrate, isolated by filtration and dried. It dyes polyacrylonitrile fibres pink tints possessing very good properties of fastness.

EXAMPLE 7

25.5 parts of 4-(N-ethyl-N-2'-hydroxyethyl)-amino-2-methylbenzylidenemalonitrile are dissolved in 35 parts of pyridine. 12.9 parts of methanesulphochloride are added dropwise at 0 to 5° C. and the batch is stirred for 3 hours. The reaction mixture is discharged into 150 parts of iced water and stirred. The product that precipitates is isolated by filtration, washed with water and dried.

6.7 parts of 4-(N-ethyl-N - 2' - methanesulphonyloxyethyl)-amino-2-methylbenzylidenemalonitrile and 6 parts of pyridine-N-oxide are stirred for 6 hours at 70° C. The reaction mixture is boiled up with water, which contains a small amount of acetic acid, and the batch is fitered while hot. The dyestuff of the formula

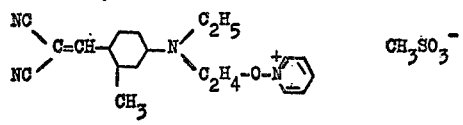

is salted out of the filtrate, isolated by filtration and dried. It dyes polyacrylonitrile fibres greenish yellow tints possessing very good properties of fastness.

EXAMPLE 8

16.8 parts of 3 - nitro-4-phenylaminobenzenesulphonic acid-2'-hydroxyethylamide are dissolved in 100 parts of pyridine. 6.9 parts of methanesulphochloride are added dropwise at 0 to 5° C. and the batch is stirred for 3 hours. The reaction mixture is discharged on to 500 parts of iced water and stirred. The product that precipitates is isolated by filtration, washed with water and dried.

14.3 parts of the methanesulphoester obtained in the manner described above and 5.7 parts of pyridine-N-oxide are stirred for 6 hours at 70° C. The reaction mixture is boiled up with water, which contains a small amount of acetic acid, and the batch is filtered while hot. The dyestuff of the formula

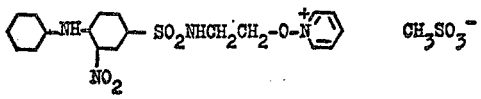

is salted out of the filtrate, isolated by filtration and dried. It dyes polyacrylonitrile fibres yellow tints possessing very good properties of fastness.

In Table 2 below are listed components that may be used for the manufacture of further dyestuffs. The dyestuffs may be obtained by reacting the reactive dyestuff intermediate products listed in Column I with the pyridine-N-oxides shown in Column II. The tints produced on polyacrylonitrile fibres are indicated in Column III.

TABLE 2

| | I | II | III |
|---|---|---|---|
| 1 | ![structure with NO2, N=N-C-C-CH3, HO-C, N, C2H4OSO2CH3] | O—N⟨⟩—OCH3 | Yellow. |
| 2 | ![structure with CH3OOC-, N=N-C-C-CH3, HO-C, N, C2H4OSO2CH3] | O—N⟨⟩ | Do. |
| 3 | ![structure with O2N-, N=N-C, H3C-C, N, C2H4OSO2CH3] | Same as above | Orange. |
| 4 | ![structure with N=N, N=N, N(C2H4CN)(C2H4OSO2CH3), CH3, CH3] | do | Do. |
| 5 | ![anthraquinone with O, OH, O, NH—C2H4OSO2CH3] | do | Violet. |
| 6 | ![anthraquinone with O, OH, O, NH—⟨⟩—OC2H4OSO2CH3] | do | Reddish blue. |

TABLE 2—Continued

| | I | II | III |
|---|---|---|---|
| 7 | (structure: cyclohexyl-O₂S-C(NC)=CH-C₆H₃(CH₃)-N(C₂H₅)(C₂H₄OSO₂CH₃)) | O—N (pyridine N-oxide) | Greenish yellow. |
| 8 | (structure: 2-NO₂-4-CH₃-C₆H₃-N=N-C(=C(CH₃)-N=)-C(OH)=, with N-C₂H₄OSO₂CH₃) | Same as above | Yellow. |
| 9 | H₅C₂OC-C₆H₄-N=N-C(=C(CH₃)-N=)-C(OH)=, N-CH₂CH(CH₃)OSO₂CH₃ | O—N—CH₃ (4-methylpyridine N-oxide) | Do. |
| 10 | O₂N-C₆H₃(CF₃)-N=N-C(=C(CH₃)-N=)-C(OH)=, N-C₂H₄OSO₂C₆H₅ | O—N(CH₃) (N-methylpiperidine N-oxide) | Do. |
| 11 | Cl-C₆H₃(CN)-N=N-C(=C(COOC₂H₅)-N=)-C(OH)=, N-C₂H₄OSO₂CH₃ | O—N (3-methylpyridine N-oxide, CH₃) | Do. |
| 12 | (H₅C₂)₂NO₂S-C₆H₂(Cl)(Cl)-N=N-C(=C(CH₃)-N=)-C(OH)=, N-C₂H₄OSO₂CH₃ | O—N (pyridine N-oxide) | Do. |
| 13 | O₂N-C₆H₃(Br)-N=N-C(=C(COOCH₃)-N=)-C(OH)=, N-CH₂CH(CH₃)OSO₂CH₃ | Same as above | Do. |
| 14 | O₂N-C₆H₂(Cl)(Cl)-N=N-C(=C(CH₃)-N=)-C(OH)=, N-C₂H₄OSO₂C₇H₇ | do | Do. |
| 15 | CH₃SO₂-C₆H₄-N=N-C(=C(CONH₂)-N=)-C(OH)=, N-C₂H₄OSO₂CH₃ | O—N—OCH₃ (4-methoxypyridine N-oxide) | Do. |
| 16 | H₅C₂O-C₆H₃(NO₂)-N=N-C(=C(CH₃)-N=)-C(OH)=, N-C₂H₄OSO₂CH₃ | O—N (pyridine N-oxide) | Orange. |

TABLE 2—Continued

| | I | II | III |
|---|---|---|---|
| 17 | [cyclohexyl-thiadiazole-N=N-C(HO-C)=C(CH₃)-N(C₂H₄OSO₂CH₃)-N pyrazole] | O—N (pyridine N-oxide) | Yellow. |
| 18 | [cyclohexyl-thiadiazole-N=N-C(HO-C)=C(CH₃)-N(C₂H₄OSO₂CH₃)-N pyrazole] | Same as above | |
| 19 | [Cl-cyclohexyl-benzothiazole-C-N=N-C(HO-C)=C(CH₃)-N(C₂H₄OSO₂CH₃)-N pyrazole] | ...do... | Do. |
| 20 | [1,8-dihydroxy-4-nitro-5-(NHC₂H₄OSO₂CH₃)anthraquinone] | ...do... | Blue. |
| 21 | [1,5-dihydroxy-4,8-bis(NHC₂H₄OSO₂CH₃)anthraquinone] | ...do... | Do. |
| 22 | [1-amino-2-methoxy-4-(NHC₂H₄OSO₂CH₃)anthraquinone] | ...do... | Violet. |
| 23 | [1-amino-2-methyl-4-(NHC₂H₄OSO₂CH₃)anthraquinone] | ...do... | Do. |
| 24 | NC\C=CH–⟨phenyl⟩–N(C₂H₄OCH₃)(C₂H₄OSO₂C₆H₅), with CH₃ on ring; H₅C₂OOC/ | ...do... | Yellow. |
| 25 | H₇C₇O₂SOH₄C₂O–⟨phenyl⟩–NH–⟨phenyl(NO₂)⟩–SO₂N(CH₃)₂ | ...do... | Do. |
| 26 | [1-amino-2-chloro-4-(NHC₂H₄OSO₂CH₃)anthraquinone] | ...do... | Violet. |
| 27 | [1-amino-2-cyano-4-(NHC₂H₄OSO₂CH₃)anthraquinone] | ...do... | Blue. |

TABLE 2—Continued

| I | | II | III |
|---|---|---|---|
| 28 |  anthraquinone with NHC₂H₄COOCH₃ and NHC₂H₄OSO₂CH₃ substituents | 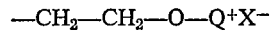 O—N pyridine | Blue. |
| 29 | 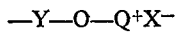 Cl—⌬—NH—⌬(NO₂)—SO₂NHC₂H₄OSO₂CH₃ | Same as above | Yellow. |
| 30 |  CH₃—⌬—NH—⌬(NO₂)—SO₂NHC₂H₄OSO₂CH₃ | do | Do. |
| 31 |  CH₃SO₂OC₂H₄O—⌬—NH—⌬(NO₂)—SO₂CH₃ | do | Do. |

What is claimed is:

1. A water-soluble basic dyestuff which corresponds to the formula $$A_1-N=N-B$$

in which $A_1$ represents a member selected from the group consisting of a benzene, thiazole-, benzthiazole-, pyrazole-, indazole-, triazole-, thiadiazole-, pyridine- and quinoline radical, which may contain no other substituents than lower alkyl, trifluoromethyl, lower alkoxy, chlorine, bromine, cyano, nitro, phenylazo, lower alkoxycarbonyl, lower alkanecarbonyl, lower alkanesulfonyl, phenylcarbonylamino, lower alkanolyamino, lower akanesufonylamino and sulfonamide, and B represents phenyl or phenyl substituted by chlorine, bromine, lower alkyl, trifluoromethyl, lower alkoxy, phenylcarbonylamino, lower alkanoylamino or lower alkanesulfonylamino, which radical B further contains a residue of the formula $$-Y-O-Q^+X^-$$

wherein Y represents an alkylene bridge containing up to 4 carbon atoms and attached to B via an —O—, —S—, —NH—,

—SO₂—, —COO—, —SO₂NH—, $$-\underset{|}{\mathrm{N}}-$$

—CONH— or $$-\underset{|}{\mathrm{SO_2N}}-$$

$$-\underset{|}{\mathrm{CON}}-$$

bridge, Q represents pyridine, quinoline or isoquinoline or pyridine, quinoline or isoquinoline substituted by chlorine, lower alkyl or lower alkoxy, Q being bound to the oxygen atom through its quaternary nitrogen atom and X represents an anion, and wherein "lower" means containing up to 4 carbon atoms and "sulfonamide" means an unsubstituted sulfonic acid amide group or a sulfonic acid amide group substituted by lower alkyl, arylloweralkyl or aryl, wherein "lower" has the meaning given above, and "aryl" means unsubstituted phenyl or phenyl substituted by lower alkyl, lower alkoxy, chlorine or bromine.

2. A water-soluble basic dyestuff as claimed in claim 1 which corresponds to the formula $$A_2-N=N-B_2$$

wherein $A_2$ represents phenyl or phenyl substituted by lower alkyl, trifluoromethyl, lower alkoxy, chlorine, bromine, cyano, nitro, phenylazo, lower alkoxycarbonyl, lower alkanecarbonyl, lower alkanesulphonyl, phenylcarbonylamino, lower alkanoylamino, lower akanesufonylamino or sufonamide, which radical $A_2$ further contains a residue of the formula $$-CH_2-CH_2-O-Q^+X^-$$

wherein $B_2$ represents 1-phenyl-3-methyl-5-hydroxypyrazole bound to the azo group in 4-position, phenyl or phenyl substituted by chlorine, bromine, lower alkyl, trifluoromethyl, lower alkoxy, phenylcarbonylamino, lower alkanoylamino or lower alkanesulfonylamino, which phenyl radical contains in para-position to the aza-group an amino group mono- or di-N-substituted by lower alkyl, aryl, cyano-lower alkyl, lower alkoxy-lower alkyl, cyano lower alkoxy-lower alkyl, aryl-lower alkyl benzyloxy-lower alkyl, lower alkoxycarbonyl lower alkyl or by the group $$-CH_2-CH_2-O-Q^+X^-$$

3. An azo dyestuff as claimed in claim 1, which corresponds to the formula

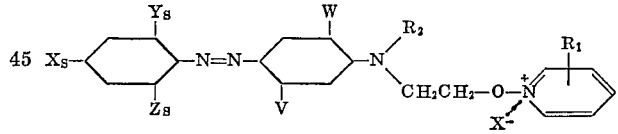

in which $X_S$ represents hydrogen, chlorine, bromine, cyano, lower alkanecarbonyl, lower alkanesulfonyl, sulfonamide, phenylazo or nitro, $Y_S$ represents hydrogen, chlorine, bromine, nitro, lower alkyl, lower alkoxy, trifluoromethyl, lower alkanecarbonyl or cyano and $Z_S$ represents hydrogen, chlorine or bromine, and in which at least one of the residue $X_S$ and $Y_S$ represents nitro, lower alkanecarbonyl, cyano, lower alkanesulfonyl or sulfonamide, V represents hydrogen, chlorine, bromine, lower alkyl, lower alkoxy, phenylcarbonylamino, lower alkanoylamino or lower alkanesulfonylamino, W represents hydrogen, lower alkyl or lower alkoxy, $R_1$ represents hydrogen, lower alkyl or lower alkoxy, $R_2$ represents lower alkyl, cyanoloweralkyl, loweralkoxyloweralkyl, benzyloxyloweralkyl, arylloweralkyl or a residue of the formula $$-CH_2-CH_2-O-Q^+X^-$$

wherein X represents an anion of the group consisting of chlorine, bromine, iodine, =SO₄, —SO₃-lower alkyl, —SO₃-aryl or —SO₃O-lower alkyl.

4. A water-soluble basic dyestuff as claimed in claim 1 which corresponds to the formula $$A_1-N=N-B$$

wherein —Y— is —CH₂CH₂—, Q⁺ is pyridine or pyridine substituted by chlorine, lower alkyl or lower alkoxy and X⁻ represents chlorine, bromine, iodine or the anion of trichlorozincic-, sulfuric-, nitric- or phosphoric-acid, of a sulfuric acid semi-lower-alkyl-ester or of an aryl- or lower-alkane carboxylic- or sulfonic acid.

5. A water-soluble basic dyestuff as claimed in claim 1 which corresponds to the formula $$A_1-N=N-B_1$$

in which $B_1$ represents the radical of 3-methyl-5-hydroxy-pyrazole bound to the azo group in 4-position and containing in 1-position the residue of the formula $$-CH_2-CH_2-O-Q^+X^-$$

References Cited
UNITED STATES PATENTS

| | | | |
|---|---|---|---|
| 2,099,525 | 11/1937 | Krzikalla et al. | 260—156 |
| 2,140,944 | 12/1938 | Schirm | 260—156 |
| 2,219,280 | 10/1940 | Graenacher et al. | 260—156 |
| 2,224,112 | 12/1940 | Krzikalla et al. | 260—156 |
| 2,821,526 | 1/1958 | Boyd | 260—156 X |
| 3,117,960 | 1/1964 | Illy | 260—156 |
| 3,148,181 | 9/1964 | Wallace et al. | 260—156 X |
| 3,170,910 | 2/1965 | Neracher et al. | 260—156 X |
| 3,341,514 | 9/1967 | Entschel et al. | 260—156 X |
| 3,346,553 | 10/1967 | Kuhne et al. | 260—156 X |

FLOYD D. HIGEL, Primary Examiner

U.S. Cl. X.R.

260—146 R, 155, 205, 286 Q, 294.7 J, 294.8 E, 294.9, 296 AE, 296 T, 297 R, 305, 306.8 R, 306.8 O, 371, 373, 465 D, 465 E, 471 R, 490, 556 B, 578

UNITED STATES PATENT OFFICE
CERTIFICATE OF CORRECTION

Patent No. 3,657,213     Dated April 18, 1972

Inventor(s) Visvanathan Ramanathan

It is certified that error appears in the above-identified patent and that said Letters Patent are hereby corrected as shown below:

Column 1, line 7, delete "Ciba Limited" and substitute -- Ciba Geigy AG --.

Signed and sealed this 7th day of May 1974.

(SEAL)
Attest:

EDWARD M. FLETCHER, JR.
Attesting Officer

C. MARSHALL DANN
Commissioner of Patents